A. F. RAMSEY.
FLY TRAP.
APPLICATION FILED MAY 29, 1912.
1,062,734. Patented May 27, 1913.
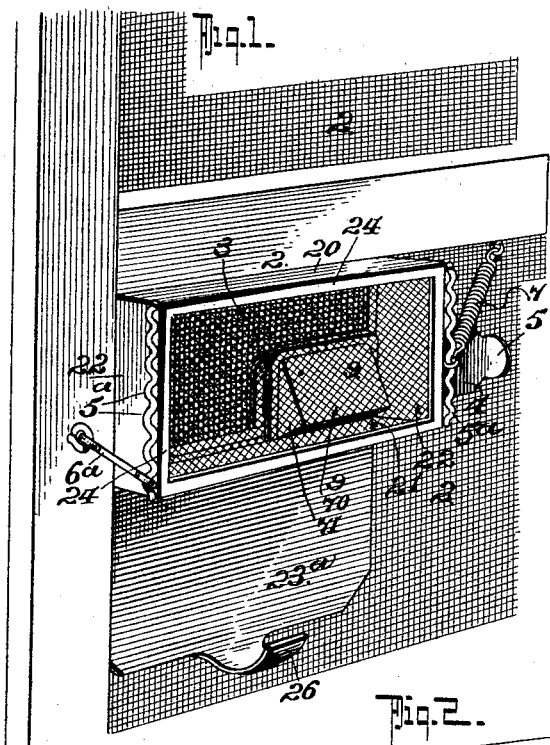
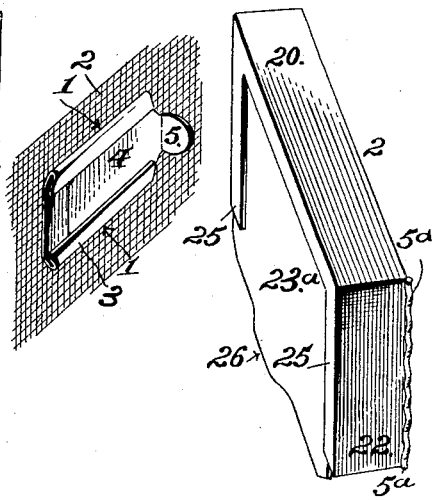
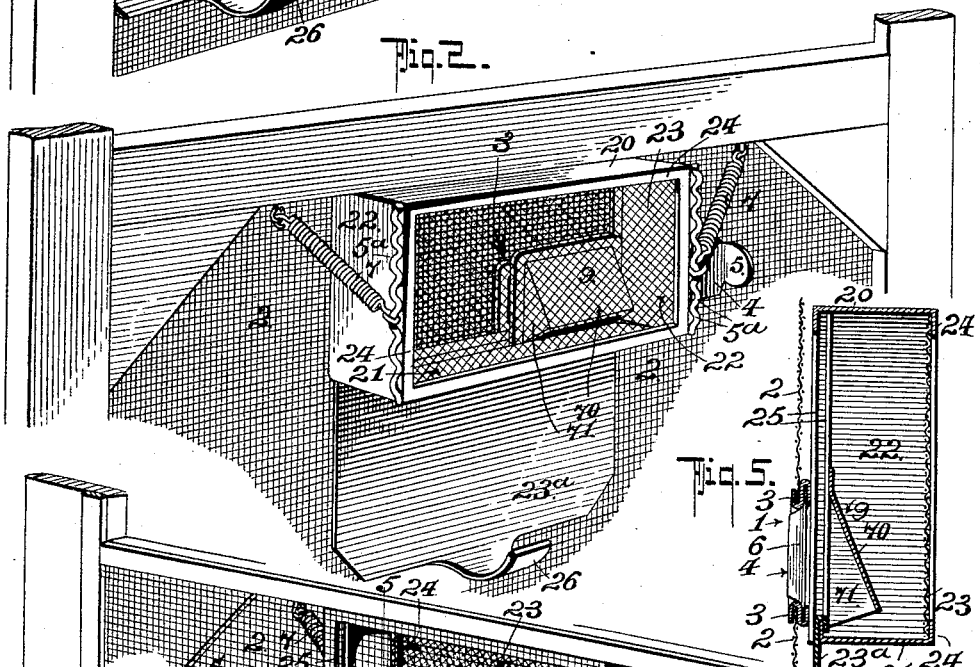
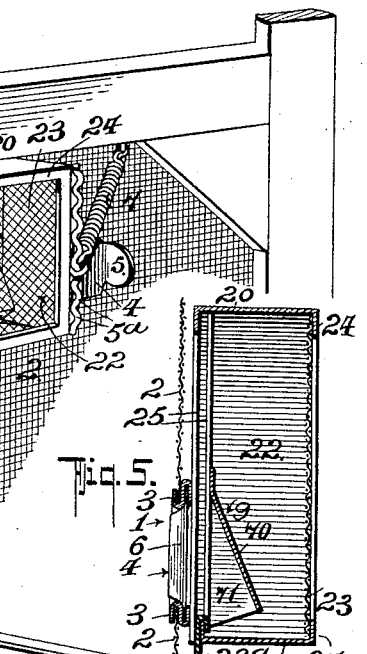
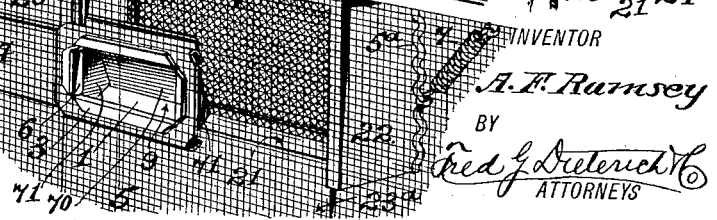
WITNESSES:
H. Woodard
R. Greenwell
INVENTOR
A. F. Ramsey
BY
Fred G. Dieterich
ATTORNEYS

UNITED STATES PATENT OFFICE.

ALBERT FRANKLIN RAMSEY, OF PLYMOUTH, OHIO.

FLY-TRAP.

1,062,734. Specification of Letters Patent. Patented May 27, 1913.

Application filed May 29, 1912. Serial No. 700,373.

*To all whom it may concern:*

Be it known that I, ALBERT F. RAMSEY, residing at Plymouth, in the county of Richland and State of Ohio, have invented a new and Improved Fly-Trap, of which the following is a specification.

My invention relates to insect catching or trapping means, and more particularly to that class of traps designed for being removably connected to window and door screens, for catching flies and it primarily has for its object to provide a trap of the character stated, of a simple and economical construction, that can be conveniently applied to or removed from the screen, and which will positively so trap and hold the flies that danger of the escape of the insects during the operation of killing them is rendered practically impossible, and from which the destroyed pests can be quickly emptied.

With other objects in view that will hereinafter be explained, my invention in its general nature comprises an improved arrangement of holder and means for removably supporting it on the screen body together with improved devices for controlling the fly passage through the screen and closing the entrance to the holder, all of which will be hereinafter fully explained, specifically pointed out in the appended claims, and illustrated in the accompanying drawings, in which:

Figure 1, is a perspective view of my invention, the same being shown as applied to one of the inside corners of a door or window screen. Fig. 2, is a similar view that illustrates the manner in which my trap devices are applied to a screen framing having corner braces. Fig. 3, is a perspective view, looking at the outside or front of the screen, with my trap applied, the same being set for use. Fig. 4, is a perspective view of a portion of the screen, and the holder or trap, the latter being shown as detached from the screen and as closed, the fly passage in the screen being also shown closed, Fig. 5, is a transverse section of my trap taken on lines 5—5, on Fig. 3.

In carrying out my invention, and in the practical application thereof, I first form an entrance or fly passage 1, in the window or door screen body 2, the edges of which are reinforced by metallic guide plates 3—3, in which slidably moves a controlling gate 4, one end of which is turned out to form a finger pull 5 and the other end of which is bent in to form a stop flange 6 to limit the outward pull of the gate 4. When the trap is set the gate 4 is pulled back from over the passage 1 and when the fly holder is to be removed, the said gate 4 is slid back to close the fly passage in the screen body, as shown.

The trap or holder 2 is formed of sheet metal preferably bent into a rectangular shaped frame composed of the top and bottom members 20—21 and the ends 22. The outer face of the holder consists of a section of screen wire 23 that is soldered or otherwise made fast to the rim or sides of the inturned flanges 24 of the frame.

25 are guide flanges on the inner edges of the end members 22 that slidably receive the end of a solid plate 23ª that forms the rear or bottom wall of the holder when it (the plate 23ª) is slid in, as shown in Fig. 4, of the drawings, and to facilitate slidably adjustments of the said plate 23ª it has an outturned finger piece 26, as shown.

5ª designates a series of eyes or loops on each of the ends of the holder, each being formed by looping a piece of stout wire secured to the said ends that extend laterally therefrom, as shown.

When attached to the corner of a window, or door screen, as shown in Fig. 1, a single hook 6ª is hung on one of the side bars of the screen near the upper end thereof for engaging the lowermost one of the eyes or loops 5ª, at one end of the holder.

7 is a spring hook that is longitudinally extensible, one end of which is connected to the upper bar of the screen and its other or hook end is hung to engage the desired one of the eyes in the corresponding end of the screen. By making one of the supporting hooks in the nature of a spring, as shown and described, the trap body can be rigidly held up on the corner of the screen, as shown in Fig. 1, and can be also easily detached by first pulling out the spring hook from the body, and then releasing the hook at the other end.

When my trap is to be applied to a screen having angle braces in the corners, the trap can be readily placed centrally of the screen, as shown in Fig. 2, both hooks when thus arranged being hung from the top rail or bar of the screen, the hooks engaging the desired ones of the eyes or loops at the opposite ends.

9 designates a hood-like guide secured to the holder at the entrance side, and which includes the downwardly and inwardly inclined back wall 70 and the end walls 71—71 which extend down to near the bottom of the holder. Hood 9, when the holder is placed in position fits over the fly entrance or passage in the screen and since the parts 71 and 71 extend to near the bottom of the holder, the entrance to the holder is restricted and so positioned with respect to the main entrance that the caught insects in flying within the holder are retarded in their efforts to seek an outlet back through the screen.

From the foregoing taken in connection with the drawings, the complete construction, the method of use and the advantages of my invention will be readily apparent.

The flies caught in the holder can be readily trapped by simply moving up the plate 3 and since they cannot escape they can be quickly destroyed by removing the holder and immersing the same in a tank of water. After being killed, the holder can be instantly freed of the dead pests, by pulling down the solid back or plate 3.

What I claim is:—

1. An insect trap comprising in combination with a body having an inlet, and means for closing the said inlet, a receiver, said receiver having all of its sides, except one, closed, a closure member for the open side slidably held on the receiver, and means for removably supporting the holder against the body having the inlet and over the inlet.

2. In an insect trap, the combination with a screen frame having an insect opening, and means for closing the opening at times; of a holder having all of its sides except one, closed, a slide plate mounted on the holder for closing the open side when the holder is removed, and means for securing the holder against the screen body over the insect inlet.

3. In an insect trap, the combination with a screen frame having an insect opening, and means for closing the opening at times; of a holder having all of its sides, except one, closed, a slide plate mounted on the holder for closing the open side when the holder is removed, and means for securing the holder against the screen body over the insect inlet, the said means consisting of a series of eyes at the opposite ends of the holder and spring tension hook devices, each connected at one end to the screen body and having their other end formed to engage with the desired ones of the eyes on the holder.

4. As a new article, a fly catching means for window and door screens comprising, a cut off member for controlling a fly passage in the screen body, a holder consisting of upper and lower members and end members, and a back portion and a hood portion for guiding the insects to the bottom of the holder as they pass in through the fly passage, a slide plate mountable on the holder and adapted for being adjusted to form a solid closure for the open side of the holder when the insects are caught therein, and means for removably mounting the holder on the screen, said means including loop members at the opposite ends of the holder, hooks pivotally connectible to the screen body, and having members for engaging the loops on the ends of the holder, at least one of the said hooks including a body portion formed of a coiled spring.

5. In combination with a screen frame including a cross piece, said frame having a fly passage at a point below the cross piece, and means mounted on the screen for closing the said passage at times; of a holder comprising a rectangular frame comprised of closed top, bottom and end portions and a screen back portion, a plate slidably mounted on the holder for sliding up over and closing the open side of the holder, and means for engaging the holder and the screen body, said means including devices for securing the holder under tension against the screen body and the cross member of its frame.

6. An insect trap comprising in combination with a body having an inlet, a receiver closed on all sides excepting the side adjacent to said body, means for securing said receiver to said body, a slide carried by the open side of said receiver for closing the same, means for limiting the withdrawal of said slide and means for closing said body inlet, said body inlet closing means having a portion continuously projecting to the outside of said receiver, and said receiver closing slide also having a portion continuously projecting to the outside of said receiver substantially as specified.

ALBERT FRANKLIN RAMSEY.

Witnesses:
F. D. GUNSAULLUS,
J. W. BELL.

Copies of this patent may be obtained for five cents each, by addressing the "Commissioner of Patents, Washington, D. C."